(No Model.)
A. H. WAGNER.
SHAFT HANGER.
No. 494,767. Patented Apr. 4, 1893.
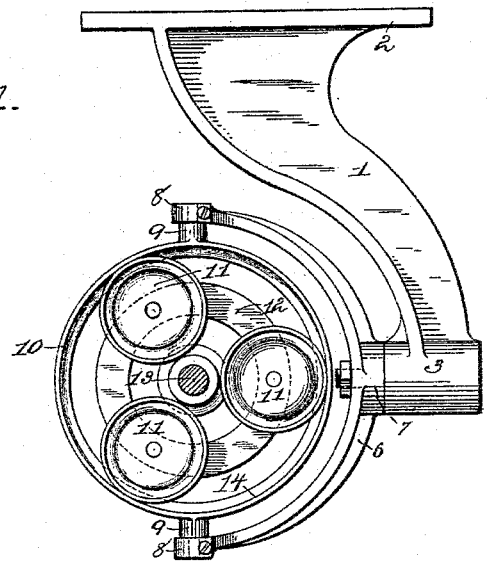
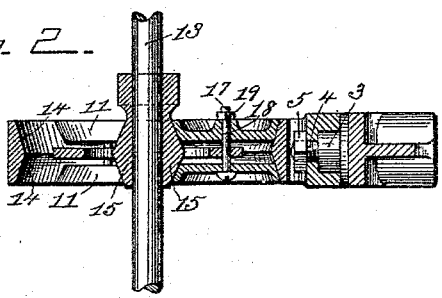
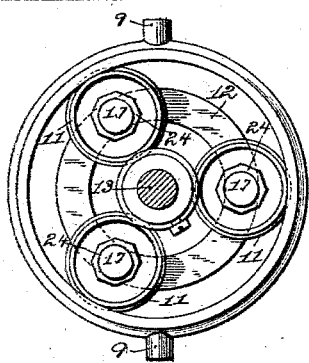
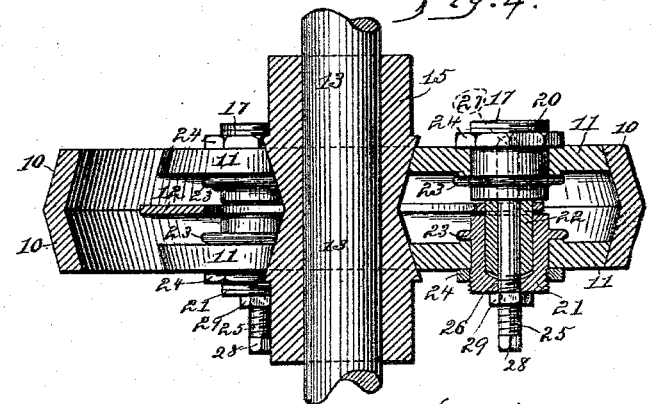
Attest:
Walter Tamarisy
Geo. E. Cruce
Inventor:
A. H. Wagner
By Knight Bros
Atty's

UNITED STATES PATENT OFFICE.

AUSBERT H. WAGNER, OF CHICAGO, ILLINOIS.

SHAFT-HANGER.

SPECIFICATION forming part of Letters Patent No. 494,767, dated April 4, 1893.

Application filed June 22, 1892. Serial No. 437,606. (No model.)

*To all whom it may concern:*

Be it known that I, AUSBERT H. WAGNER, a citizen of the United States, residing at Chicago, in the county of Cook and State of Illinois, have invented certain new and useful Improvement in Hangers for Shafting, of which the following is a specification.

My invention relates to that class of hangers in which the shaft is provided with a wearing sleeve which is supported by the peripheries of a number of circumferentially arranged anti-friction rollers which are in turn mounted in a ring or circular track, which ring or track is universally pivoted for the purpose of permitting the bearing to assume at all times a position accurately transverse to the shafting and thereby avoid unequal wear on any one part.

My invention relates especially to the construction of the ring, anti-friction rollers, and wearing sleeve whereby a more accurate adjustment of the parts is permitted individually and independently.

My invention consists in forming the wearing sleeve and the surrounding ring or annular track each with two bearing faces, the two faces in each part as well as the corresponding faces in the respective parts being inclined to each other, and forming the anti-friction rollers with peripheries beveled at an angle corresponding to the angles of the bearing faces of the wearing collar and surrounding ring or annular track and connecting said anti-friction rollers in pairs by adjustable axes adapted to force the respective rollers into engagement with the bearing faces between which they are mounted.

My invention may be carried out in either of two ways. In the first place the beveled faces of the wearing sleeve and ring may be inclined outwardly and the friction rollers inclined inwardly and drawn together for the purpose of causing a more intimate contact between the rollers and bearing faces in taking up wear; or the beveled faces of the wearing sleeve and ring may be inclined inwardly and the friction rollers inclined outwardly and forced apart for the purpose of bringing them into more intimate contact with the bearing faces for taking up wear. In both cases it is desirable to use a concentric spacing ring within the outer ring or annular track, between the parts of the friction rollers and perforated to receive the adjustable axes of said friction rollers.

My invention will be fully understood upon reference to the accompanying drawings, in which:—

Figure 1 is an elevation of the simpler form of my invention. Fig. 2 is a horizontal axial section through the same. Fig. 3 is a side elevation or portion of the hanger, illustrating the modified form. Fig. 4 is a horizontal axial section of the same on an enlarged scale.

1 represents the hanger arm provided at its upper end with an attaching flange 2 and at its lower end with the spindle 3 having a reduced portion 4 and a securing nut 5.

6 is a swiveled yoke having a journaled box 7 which receives the spindle 3 at its center and boxes 8 at its extremities, which receive trunnions 9 of the annular track or outer ring 10. Within the annular track or ring are anti-friction rollers 11 having a spacing ring 12, and supported centrally between the peripheries of the anti-friction rollers is the shaft 13.

The annular track or ring 10 is provided with oppositely inclined bearing faces 14, which are shown in Figs. 1 and 2 as inclined outwardly, while the shaft 13 is provided with the wearing sleeve 15, which is provided with bearing faces 16 inclined oppositely to the corresponding faces 14 of the outer ring, and therefore likewise outwardly inclined in Figs. 1 and 2.

The friction rollers are arranged in pairs, and the respective rollers of each pair are provided with oppositely beveled peripheries formed at an angle corresponding to the inclination of the faces 14 and 16. In order to take up wear in the parts, it is simply necessary that these friction rollers 11 be forced against the inclined faces upon which they bear. In Figs. 1 and 2 this is accomplished by drawing the friction rollers together. In order to draw the rollers together, they are mounted on adjustable axles 17, which in this form of hanger consist simply in the bolts 18 having nuts 19.

In the form shown in Figs. 3 and 4, the bearing faces of the sleeve 15 and outer ring 10 are inclined inward or opposite to the inclination of the corresponding parts in Figs. 1 and 2. The friction rollers 11 are likewise beveled opposite to those of Figs. 1 and 2. In this form, in order to take up wear, it is necessary to force the friction rollers apart. To accomplish this purpose each adjustable axis consists of two barrels 20 and 21, upon which the rollers are mounted, and of these the former is provided with a reduced projection 22, while the latter is bored out from its inner end to receive said projection. The friction rollers are held upon the barrels 20 and 21 between flanges 23 formed integrally with the barrels and nuts 24 screwed onto the outer ends of said barrels. It will thus be seen that the friction rollers are permitted to turn independently on the adjustable axis, and the parts of said adjustable axis may be moved relatively for the purpose of changing the distances between the friction rollers 11.

In order to force the wheels apart and to hold them against the oppositely inclined bearing faces, a push-screw 25 is threaded through the outer end 26 and the barrel 24, which is bored out for the purpose, and finds bearing for its inner end 27 in the outer end of the bore in said barrel 20. It will thus be seen that by turning the screw 25 by its head 28 in the proper direction the barrels 20 and 21 will be forced apart. The screw 25 is held to any adjustment by means of the jam-nut 29. In the form shown in Figs. 3 and 4, the spacing frame 12 is perforated to receive the projections 22 on barrels 20 and said spacing frame rests between the adjacent inner ends of said barrels 20 and 21.

In both of the constructions above described it will be seen that the shaft is supported entirely by the anti-friction rollers. When any one of the several pairs of rollers becomes worn that pair may be readily adjusted by being drawn together or forced apart according to the shapes of the wearing collar and outer ring. The shaft is hung upon a universal joint so that its bearing may always assume a position in a plane transverse to the axis of the shaft, and the friction of turning will be reduced to a minimum, while the use of lubricants is almost entirely avoided. The only friction is between the adjustable axes and the spacing ring; but this is found to be almost inconsiderable, inasmuch as no weight is brought to bear upon the spacing ring.

In the particular construction of the hanger and universally pivoted ring durability and convenience in assembling the parts are secured.

Having thus described my invention, the following is what I claim as new therein and desire to secure by Letters Patent:

1. The combination of the hanger 1, having the spindle 3, and projection 4, the yoke 6, having a central journal-box 7 for the reception of the spindle 3 and the projection 4, the nut 5 for securing the yoke to the spindle, the annular track or ring trunnioned in the extremities of the yoke, the wearing sleeve, and the anti-friction rollers located between the wearing sleeve and the outer ring, all substantially as set forth.

2. An anti-friction bearing comprising the wearing sleeve and the outer ring or annular track provided each with oppositely inclined bearing faces, and the anti-friction rollers having faces beveled to correspond with the inclined bearing faces, and adjustable axes connecting the rollers in pairs, for the purposes set forth.

3. An anti-friction bearing comprising the outer ring, the inner wearing sleeve, and the anti-friction rollers arranged within the outer ring and around the wearing sleeve; said sleeve and ring, being formed with outwardly inclined bearing faces and said anti-friction rollers being formed with inwardly beveled peripheries formed at angles corresponding to the angle of inclination of the bearing faces of the ring and sleeve and the adjustable axes for connecting the rollers together in pairs and adjusting the several pairs individually by drawing the rollers together, substantially in the manner and for the purpose explained.

4. An anti-friction bearing comprising the wearing sleeve and the outer ring formed with oppositely inclined bearing faces, the anti-friction rollers beveled to correspond to said bearing faces, and adjustable axes for forcing the rollers into contact with said bearing faces, and the spacing ring located beneath the rollers of the respective pairs and perforated for the reception of their axes, substantially as and for the purposes set forth.

5. In an anti-friction hanger for shafting, the combination of the universally pivoted ring 10 the concentric shafting, the anti-friction rollers arranged within the ring and around the shafting, and the adjustable axes for adjusting the pairs of friction rollers individually and independently, all substantially as set forth.

AUSBERT H. WAGNER.

Witnesses:
 GEO. BANKS,
 W. H. BAYLES.